(12) United States Patent
Allain et al.

(10) Patent No.: US 6,405,862 B1
(45) Date of Patent: Jun. 18, 2002

(54) AUTOMOBILE FLOOD PROTECTION SYSTEM AND METHOD

(76) Inventors: Mark Allain; Joseph Allain, Jr., both of 4932 Chantilly Dr., New Orleans, LA (US) 70126

(*) Notice: Subject to any disclaimer, the term of this patent is extended or adjusted under 35 U.S.C. 154(b) by 581 days.

(21) Appl. No.: 09/102,677

(22) Filed: Jun. 23, 1998

Related U.S. Application Data

(63) Continuation-in-part of application No. 09/014,995, filed on Jan. 28, 1998, now Pat. No. 5,954,200, and a continuation-in-part of application No. 08/887,421, filed on Jul. 2, 1997, and a continuation-in-part of application No. 08/660,663, filed on Jun. 5, 1996, now Pat. No. 6,059,105.

(51) Int. Cl.[7] .............................................. B65D 85/68
(52) U.S. Cl. ....................................... 206/335; 150/166
(58) Field of Search ........................... 206/335; 150/166, 150/167, 901; 296/130, 136

(56) References Cited

U.S. PATENT DOCUMENTS

| 3,474,803 | A | * | 10/1969 | Davis | 206/335 |
|---|---|---|---|---|---|
| 4,315,535 | A | * | 2/1982 | Battle | 206/335 |
| 4,930,557 | A | * | 6/1990 | Lohse | 150/166 |
| 5,458,945 | A | * | 10/1995 | Tall | 150/166 |
| 5,497,819 | A | * | 3/1996 | Chiang | 150/166 |
| 5,664,825 | A | * | 9/1997 | Henke et al. | 150/166 |
| 5,800,006 | A | * | 9/1998 | Pettigrew | 150/166 |

* cited by examiner

Primary Examiner—Luan K. Bui
(74) Attorney, Agent, or Firm—Jim Zegeer

(57) ABSTRACT

A motor vehicle flood protection apparatus includes a plastic container member having a bottom panel and integrally joined end, and side panels that have edges joined to form a vehicle container. The end and side panels have a vertical height that is less than the height of a vehicle to be flood protected but well above the float level for the motor vehicle and of sufficient height that, when surrounded by flood waters, the container floats with the vehicle carried therein. A pair of reinforcement strips joined to the bottom panel resists puncture of the plastic container member. One or more flap members are joined to the side of the container and a plurality of grommets are provided in the one or more flap members. A tether line for securing the plastic container member (with a vehicle thereon) to a stationary object that can be coupled to the grommets on the flaps.

14 Claims, 8 Drawing Sheets

Entrance End Folded
On The Container

AUTOMOBILE FLOOD PROTECTION SYSTEM AND METHOD

The present application is a continuation-in-part of our application Ser. No. 08/660,663 filed Jun. 5, 1996, U.S. Pat. No. 6,059,105 for MOTOR VEHICLE AND VALUABLE POSSESSION FLOOD PROTECTION and a continuation-in-part of our application Ser. No. 09/014,995 filed Jan. 28, 1998, U.S. Pat. No. 5,954,200 for MOTOR VEHICLE PROTECTION APPARATUS AND METHOD and a continuation-in-part of our copending application Serial No. 08/887,421 filed Jul. 2, 1997 for INFLATABLE CAR RESCUE BAG.

The present invention relates to automobile flood protection system in which a plastic container member having a bottom panel and integrally joined end and side panels such that when a vehicle is contained thereby and is surrounded by flood waters, the container floats with the vehicle carried therein. The present invention provides a pair of reinforcing strips on the bottom panel to resist puncture of the plastic container when the vehicle is driven thereon and one or more flap members joined to the sides of a container with a plurality of grommet holes in the flat member for tethering purposes. The invention also relates to a method of folding the vehicle flood protection container in an expeditious and compact way so that the container can be unfolded in a systematic pattern$_x$ When the container is unfolded, the vehicle can be easily pushed driven onto the container so that the sides can be extended upwardly and snugged by a snugging device against the sides of the vehicle.

The present invention is an improvement on the vehicle flood protection systems disclosed in our patent application Ser. No. 08/660,663 filed Jun. 5, 1996 for MOTOR VEHICLE AND VALUABLE POSSESSION FLOOD PROTECTION APPARATUS AND METHOD, our patent application Ser. No. 09/014,995 filed Jan. 28, 1998 for MOTOR VEHICLE PROTECTION APPARATUS AND METHOD incorporated herein by reference, and our application Ser. No. 08/887,421 filed Jul. 2, 1997 for INFLATABLE CAR RESCUE BAG incorporated herein by reference.

According to the present invention, a motor vehicle flood protection apparatus comprises at least a lower plastic or other water proof container member having a bottom panel and integrally joined end and side panels that have edges joined to form a vehicle container with the end and side panels having vertical heights which are less than the height of a vehicle to be flood protected but well above the "float level" (as defined in our application Ser. No. 08/660,663) for the motor vehicle and of sufficient height that, when surrounded by flood waters, the container floats with the vehicle carried therein. According to the present invention, a pair of reinforcement strips are joined to the bottom panel to resist puncture of the plastic container member and at least one tether securement flap member is joined to the side of the container, each flap contains a plurality of grommet holes for purposes of tethering the container or otherwise securing objects to the container.

According to the method disclosed herein, a vehicle flood protection container (VFPC) is folded by first laying a VFPC flat on a ground surface with the pair of reinforcing strips having outside edges parallel to the center of the VFPC. Then, the lateral quarters of the VFPC are folded inwardly along the outside edges of the reinforcing strips, respectively. Then the ends of the VFPC are folded along the ends of the portion strips. The VFPC is folded into the center of the reinforcing strips along the lines transverse to the axis and, finally, the VFPC is folded along the axis.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
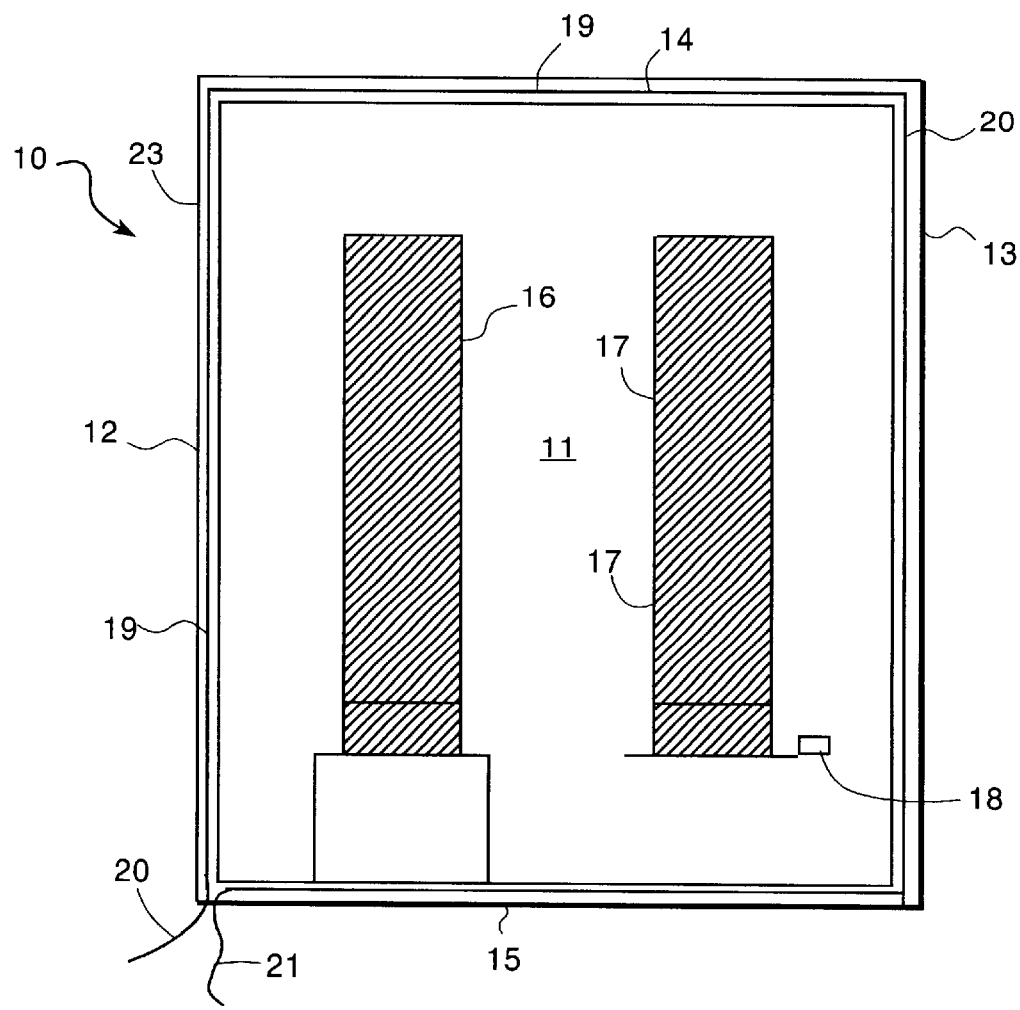
FIG. 1 is a top plan view of a single layer bottom of the car bag incorporating the invention.
Figure 2:
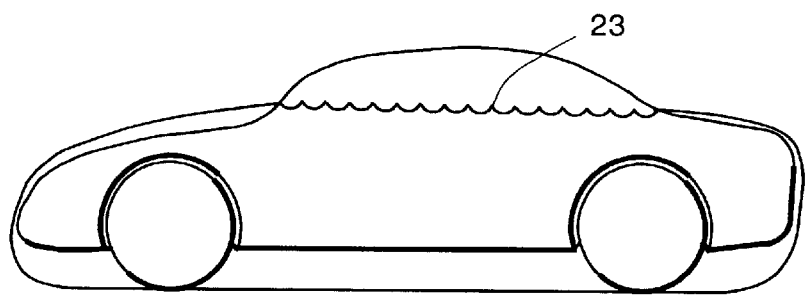
FIG. 2 is a side elevation view showing the container "close" and around the vehicle.
Figure 3:
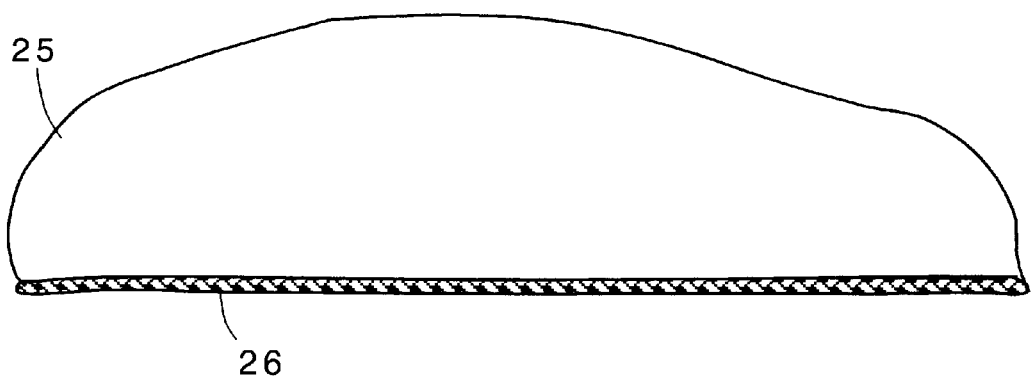
FIG. 3 is a side elevation view of a top cover having an elastic hem or pull rope for the waterproof top cover.
Figure 4:
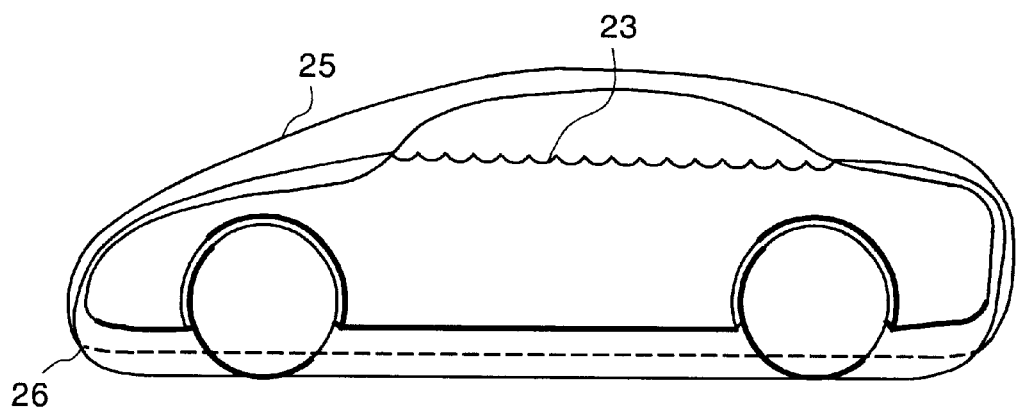
FIG. 4 is a side elevation view showing the top cover in place or the bottom bag or container which is closed or snugged against the sides of the vehicle.
Figure 5:
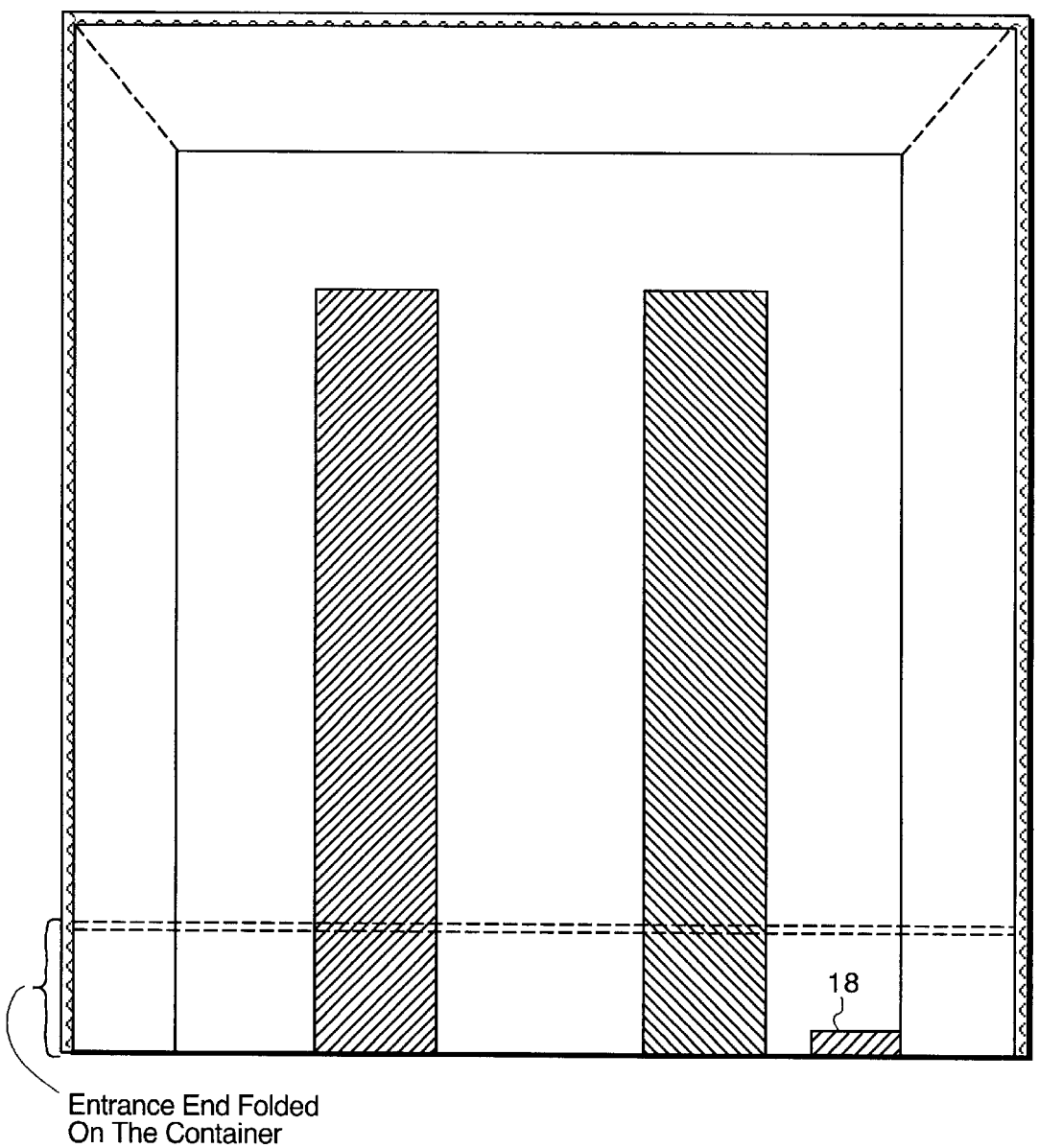
FIG. 5 is a top plan view showing the entrance end of the contain folded back.
Figure 6:
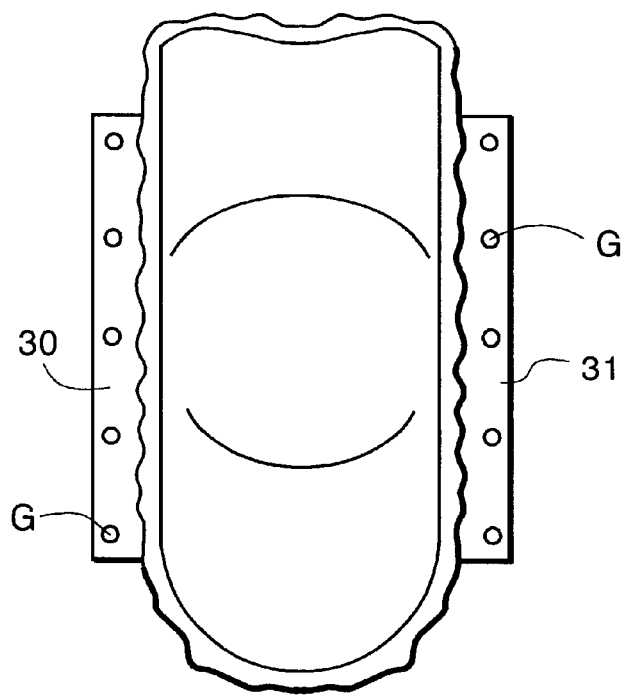
FIG. 6 is a top plan view showing the grommets in the flaps.
Figure 7:
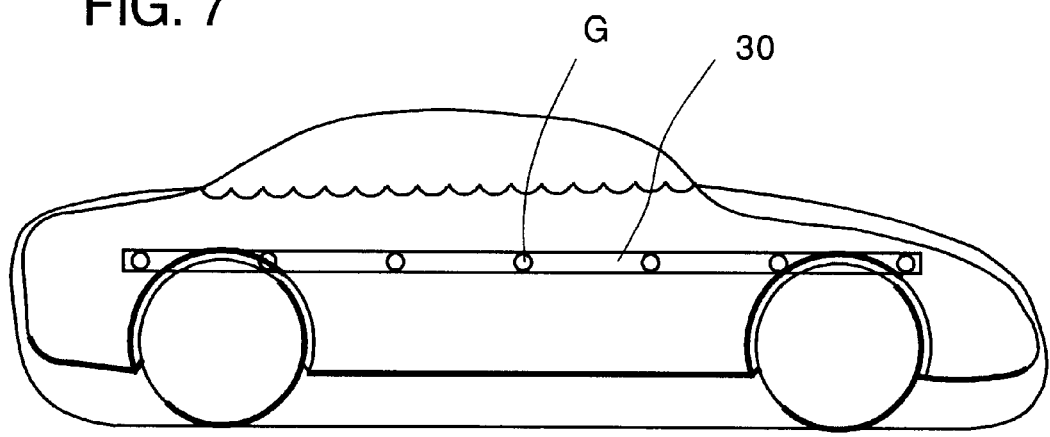
FIG. 7 is a side elevation view showing the seal flaps with the vehicle enclosed in the container.
Figure 8:
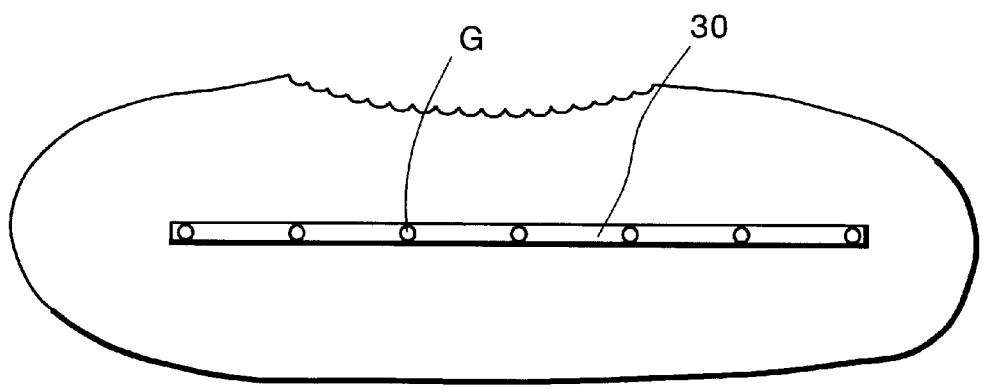
FIG. 8 is a side view of the bag showing the position of the flaps and grommets.
Figure 9:
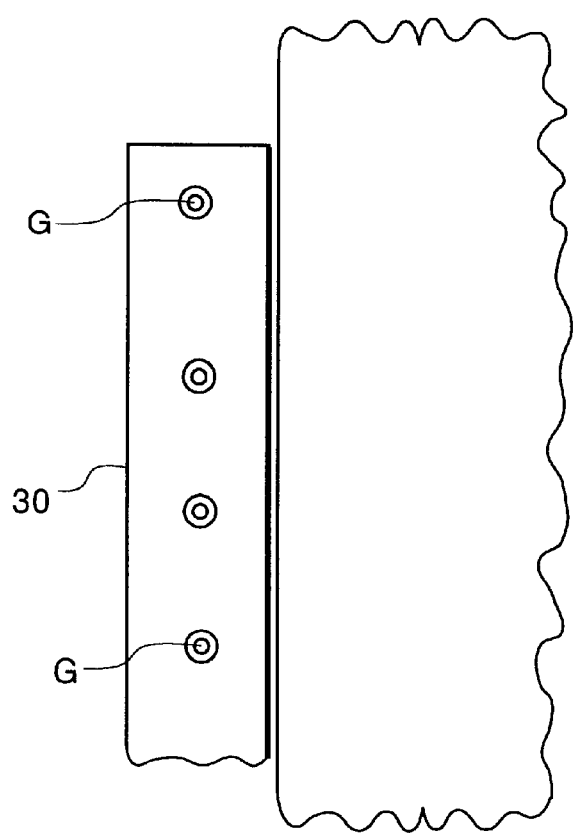
FIG. 9 is an enlarged view of a portion of the seal flaps with brass grommets.

Referring now to FIG. 1, a single bottom layer car bag container 10 is illustrated in plan view with a bottom panel 11, side panels 12 and 13 and end panels 14 and 15. All the panels can be integral or joined at their contiguous edges to form containers to form a waterproof enclosure for the vehicle. Bottom panel 11 in this embodiment is provided with reinforced layers or strips 16 and 17. These reinforced strips 16 and 17 are from ⅛th" to ¼th" thick and are made of plastic or rubber or similar material and are designed to resist puncture for the wheels of the vehicle. The car entrance end 15 is designated by a red patch 18 which is near reinforced layer 17. A pull rope or drawstring 19 having ends 20, 21 is carried in a hem 23 so that when the ends of the pull rope 20, 21 are pulled, the hemmed edge of the container 10 is snugged against the upper surfaces of the vehicle. As disclosed in our patent application Ser. No. 08/660,663 filed Jun. 5, 1996, an inexpensive waterproof top cover 25, shown in FIG. 3, has an elastic hem or pull rope 26 in the lower edges thereof so that it may be fitted over the vehicle with the bottom cover 10 in place as shown in FIG. 4.

According to this aspect of the invention, the container is then unfolded on a flat, relative debris-free area. The entrance end is folded under (or over on) the container so that the reinforced areas, strips 16 and 17, for tire tracks are at the beginning of the entrance edge. The vehicle is driven or pushed onto the container 10 with the wheels positioned on the reinforced tracks or strips 16 and 17. After the driver exits the vehicle, the sides are pulled up from the front and sides and back of the container up above the hood and trunk of the vehicle where applicable. Then the ends 20, 21 of pull rope 19 are tightened so as to snug the upper edges of the container 10 around the upper portions of the passenger compartment of a vehicle. The pull rope ends are tied and then waterproof container cover 25 is fitted, preferably below the bumpers of the vehicle. Appropriate tethers are secured to selected grommets, and anchors are utilized as desired to prevent flood waters from carrying the floating car away. Preferably, at least two tethers, one fore and one aft, are used to prevent significant change in position with change in direction of flow of the flood waters.

Referring now to FIGS. 6, 7, 8 and 9, side flaps 30, 31 are hermetically sealed and joined to the sides of the lower 10 VFPC component and are provided with brass grommets G, at preferably spaced intervals of about three feet, primarily for tethering purposes.

Folding the Container for Storage

Figure 10A:
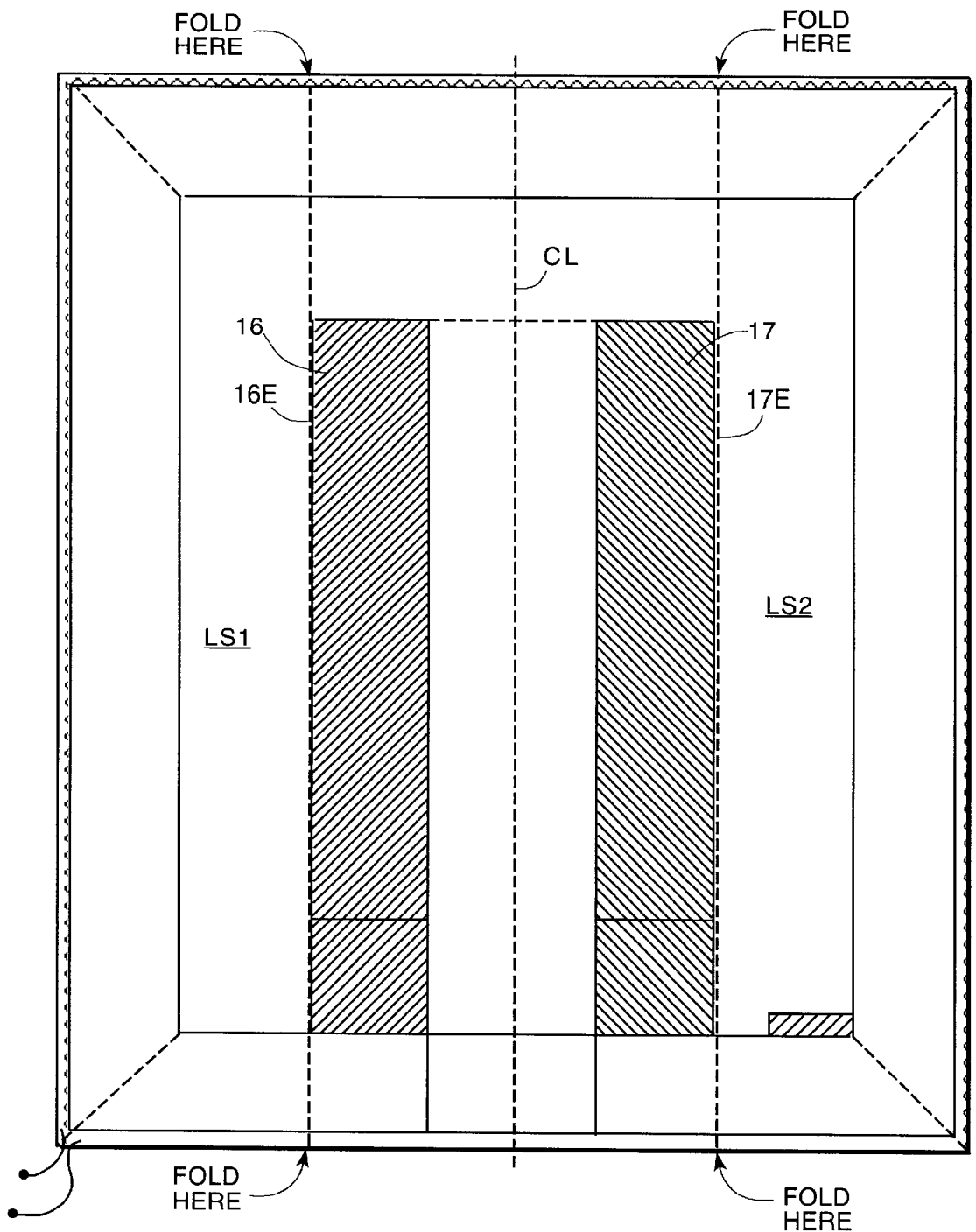
FIGS. 10A–10E are diagrammatic illustrations of folding of the containers VFPC prior to or after use for storage.
Figure 10B:
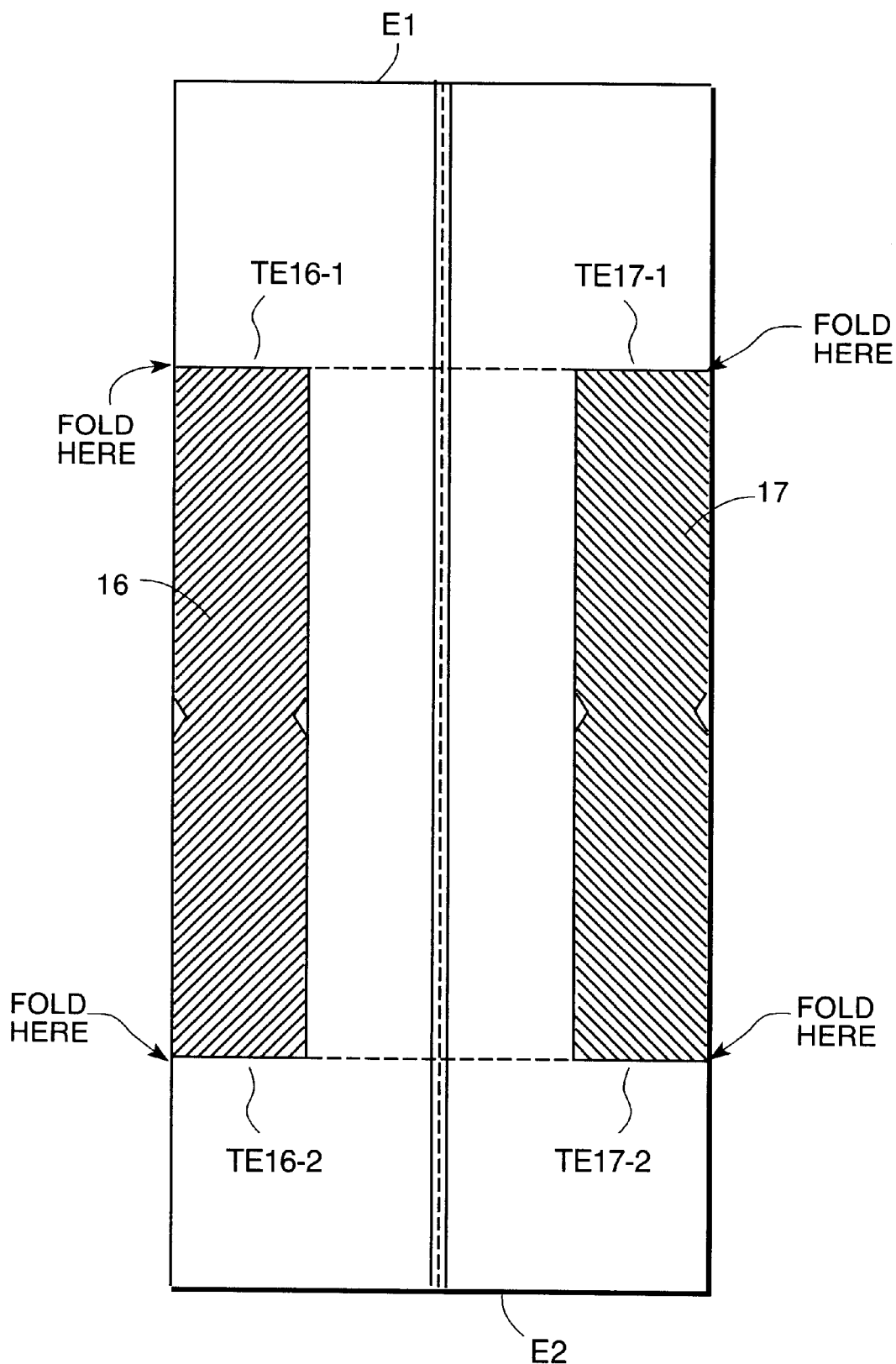
Figure 10C:
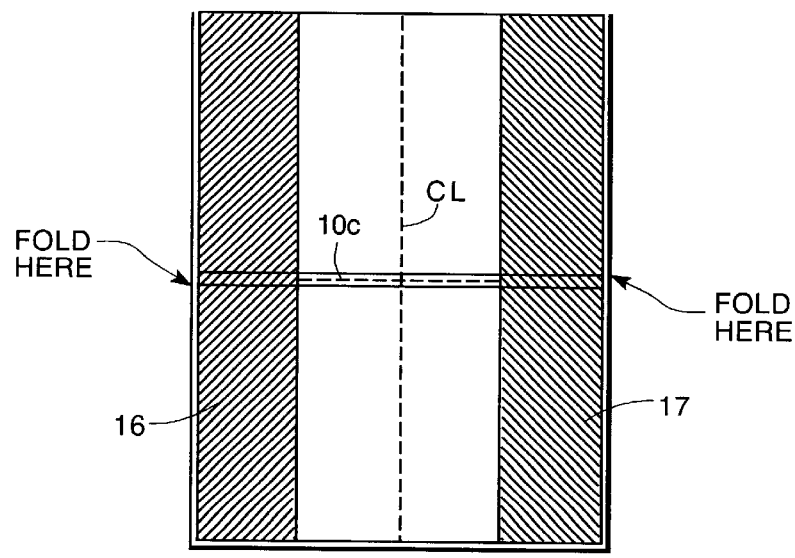
Figure 10D:
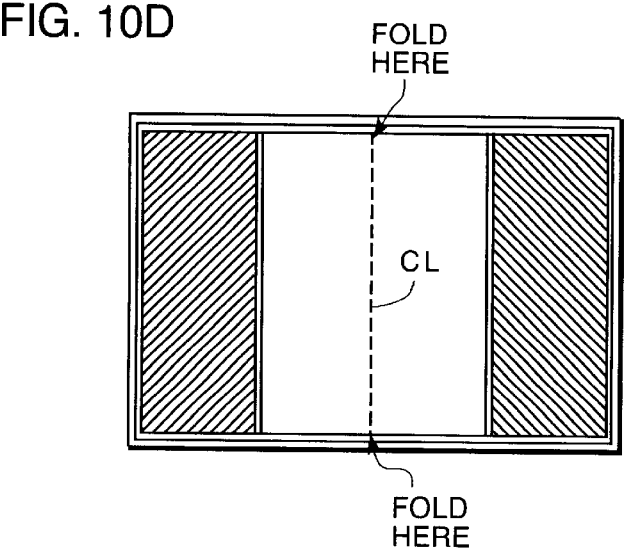
Figure 10E:
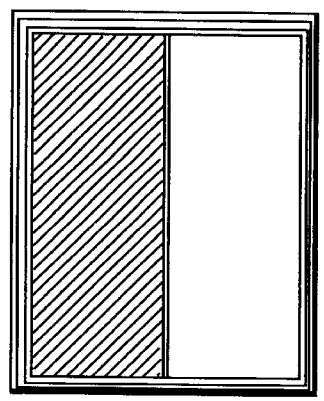

As shown in the plan view of FIG. 10A, the centerline CL is equidistantly spaced from the edges 16e and 17e of reinforcing strips 16 and 17. The first fold is by folding the lateral sides LS1 and LS2 over fold lines extending along edges 16e and 17e resulting in the arrangement shown in FIG. 10B. Then the ends E1 and E2 are folded up along fold lines that are the edges of the reinforcing strips 16 and 17, namely, TE16-1, TE17-1 and TE16-2 and TE17-2 to result in the arrangement in FIG. 10C. Then the-assembly is folded up line 10c which is transverse to the center on CL resulting in the arrangement shown in FIG. 10D. Finally, the fold assembly is folded on the centerline CL resulting in the compact arrangement shown in FIG. 10E.

As described in the preferred embodiments of the invention, it will be appreciated that other embodiments, adaptations, modifications and changes to the preferred embodiment can be effected by those skilled in the art.

We claim:

1. A motor vehicle flood protection apparatus, comprising a water-impervious flexible plastic container having a bottom panel, said bottom panel having a perimetrical edge with two long sides and two short sides, side and end walls, each of said walls having upper and lower edge with said lower edges being integrally joined to said perimetrical edge of said bottom panel, a pair of reinforcement strips on the bottom panel, and an indicia at one end of said plastic container designating the entrance end thereof, a top cover panel having four lateral perimetrical edges, a gathering rope, a gathering rope passage formed in the upper edges of said side walls and said end walls, said gathering rope pulling said upper edges of said side walls and said end walls snugly against an upper passenger compartment portion of a protected vehicle so that said lateral perimetrical edges of said top cover panel are overlapped and positioned below said upper edges of said walls so that water flowing over lower edges of said top cover engages said plastic container substantially below said upper edges.

2. The motor vehicle flood protection apparatus defined in claim 1, further including elastic hem means in said upper edges of said side walls and said end walls.

3. The motor vehicle flood protection apparatus defined in claim 1 including a tether anchor member secured to said flexible plastic container adjacent said lower edges and an anchor stake releasably secured to said tether anchor.

4. A motor vehicle flood protection apparatus (MVFPA), comprising a lower plastic container member having a bottom panel and integrally joined end, and side panels that have lateral edges joined to form a vehicle container, said end and side panels having a vertical height that is less than the height of a vehicle to be flood-protected but of sufficient height that, when surrounded by flood waters, said container floats with the vehicle therein, said end and side panels having upper edges, said bottom panel having a parallel pair of reinforcing strips so that the path of the wheels of said vehicles on said bottom panel is protected from puncture, a snugging device for tightening said upper edges of said end and side panels against the upper passenger compartment of said vehicle, and fore and aft tether means for securing said lower plastic container member to a stationary object.

5. The MVFPA defined in claim 4 wherein said lower plastic container member has an indicia at one end designating the vehicle entrance end thereof.

6. A method of folding a vehicle flood protection container (VFPC) defined in claim 4 after use:

a) laying the VFPC flat on ground surface with said pair of reinforcing strips having outside edges parallel to the centerline of said VFPC, b) folding the lateral quarters of said VFPC inwardly along the outside edges of said reinforcing strips, c) folding the ends of said VFPC along the terminal ends of said reinforcing strips, respectively, d) folding the VFPC at the center of said reinforcing strips along a line transverse to said axis, and, finally, e) folding said VFPC along said axis.

7. A motor vehicle flood protection apparatus, comprising a plastic container member having a bottom panel and integrally joined end, and side panels that have edges joined to form a vehicle container, said end and side panels having a vertical height that is less than the height of a vehicle to be flood protected but well above the float level for the motor vehicle and of sufficient height that, when surrounded by flood waters, said container floats with the vehicle carried therein, including one or more flap members joined to the side of said container and a plurality of grommets in said one or more flap members, and fore and aft tether means for securing said lower plastic container member to a stationary object.

8. The motor vehicle flood protection apparatus defined in claim 7 wherein said tether means includes a plurality of tether lines in spaced relation around said plastic container member.

9. The motor vehicle flood protection apparatus defined in claim 7 in which each said tether means includes an adjustable tether line member.

10. The motor vehicle flood protection apparatus defined in claim 7, a pair of reinforcement strips joined to said bottom panel to resist puncture of said plastic container member.

11. A motor vehicle flood protection apparatus, comprising a flexible plastic container member made of waterproof material and having a bottom panel and integrally joined end, and side panels that have edges joined to form a container for a four-wheeled motorized vehicle, said end and side panels having a vertical height that is less than the height of a four-wheeled motorized vehicle to be flood protected but well above the float level for the four-wheeled motorized vehicle and of sufficient height that, when surrounded by flood waters, said container floats with the four-wheeled motorized vehicle carried therein, a reinforcement means on said bottom panel to resist puncture of said plastic container member when the tires of a vehicle rest thereon, and at least fore and aft tether means for securing said plastic container member to stationary objects.

12. The motor vehicle flood protection apparatus defined in claim 11 wherein said reinforcement means includes a pair of spaced reinforcement strips secured to said bottom panel to support the wheels of said four-wheeled motorized vehicle.

13. The motor vehicle flood protection apparatus defined in claim 11 in which each said fore and aft tether means includes an adjustable tether line member.

14. The motor vehicle flood protection apparatus defined in claim 11 including one or more flap members joined to the side of said container and a plurality of grommets in said one or more flap members.

* * * * *